United States Patent
Motoki et al.

(10) Patent No.: US 12,469,852 B2
(45) Date of Patent: Nov. 11, 2025

(54) PASTE FOR SECONDARY BATTERY, SLURRY FOR SECONDARY BATTERY POSITIVE ELECTRODE, POSITIVE ELECTRODE FOR SECONDARY BATTERY, SECONDARY BATTERY, AND METHOD OF PRODUCING PASTE FOR SECONDARY BATTERY

(71) Applicant: ZEON CORPORATION, Tokyo (JP)

(72) Inventors: Junpei Motoki, Tokyo (JP); Mayumi Fukumine, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 698 days.

(21) Appl. No.: 17/755,107

(22) PCT Filed: Oct. 23, 2020

(86) PCT No.: PCT/JP2020/040000
§ 371 (c)(1),
(2) Date: Apr. 21, 2022

(87) PCT Pub. No.: WO2021/085344
PCT Pub. Date: May 6, 2021

(65) Prior Publication Data
US 2022/0367875 A1 Nov. 17, 2022

(30) Foreign Application Priority Data
Oct. 31, 2019 (JP) .................... 2019-199336

(51) Int. Cl.
*H01M 4/62* (2006.01)
*H01M 10/0525* (2010.01)
*H01M 4/02* (2006.01)

(52) U.S. Cl.
CPC ........... *H01M 4/625* (2013.01); *H01M 4/622* (2013.01); *H01M 10/0525* (2013.01); *H01M 2004/028* (2013.01); *H01M 2220/20* (2013.01)

(58) Field of Classification Search
CPC .............................. H01M 4/622; H01M 4/625
See application file for complete search history.

(56) References Cited

U.S. PATENT DOCUMENTS

| | | |
|---|---|---|
| 2017/0352915 A1 | 12/2017 | Katagiri et al. |
| 2020/0365901 A1 | 11/2020 | Sugawara et al. |
| 2021/0005894 A1 | 1/2021 | Murase et al. |
| 2022/0367875 A1* | 11/2022 | Motoki ............. H01M 10/0525 |

FOREIGN PATENT DOCUMENTS

| | | | |
|---|---|---|---|
| JP | 2018160418 A | | 10/2018 |
| KR | 20170135564 A | * | 12/2017 |
| WO | 2016103730 A1 | | 6/2016 |
| WO | 2019107463 A1 | | 6/2019 |
| WO | 2019181869 A1 | | 9/2019 |

OTHER PUBLICATIONS

Arrigo et al, Tuning the Acid/Base Properties of Nanocarbons by Functionalization via Amination, Journal of the American Chemical Society, 132, 9616-9630 (2010). (Year: 2010).*
Machine translation of WO 2019/181869 (no date) (Year: 0000).*
Jan. 12, 2021, International Search Report issued in the International Patent Application No. PCT/JP2020/040000.
May 3, 2022, International Preliminary Report on Patentability issued in the International Patent Application No. PCT/JP2020/040000.
Oct. 16, 2024, the Extended European Search Report issued by the European Patent Office in the corresponding European Patent Application No. 20882157.9.

* cited by examiner

*Primary Examiner* — Amanda C. Walke
(74) *Attorney, Agent, or Firm* — KENJA IP LAW PC

(57) ABSTRACT

Provided is a paste for a secondary battery that can cause an electrode mixed material layer to display excellent adhesiveness and can reduce internal resistance of a secondary battery. The paste for a secondary battery contains a conductive additive, a polymer, and a dispersion medium. The conductive additive includes one or more carbon nanotubes having a surface acid content of not less than 0.01 mmol/g and not more than 0.15 mmol/g, a surface base content of not less than 0.005 mmol/g and not more than 0.500 mmol/g, a ratio of the surface acid content relative to the surface base content of not less than 1.3 and not more than 3.0, and a specific surface area of 150 m$^2$/g or more.

10 Claims, No Drawings

PASTE FOR SECONDARY BATTERY, SLURRY FOR SECONDARY BATTERY POSITIVE ELECTRODE, POSITIVE ELECTRODE FOR SECONDARY BATTERY, SECONDARY BATTERY, AND METHOD OF PRODUCING PASTE FOR SECONDARY BATTERY

TECHNICAL FIELD

The present disclosure relates to a paste for a secondary battery, a slurry for a secondary battery positive electrode, a positive electrode for a secondary battery, a secondary battery, and a method of producing a paste for a secondary battery.

BACKGROUND

Secondary batteries such as lithium ion secondary batteries have characteristics such as compact size, light weight, high energy density, and the ability to be repeatedly charged and discharged, and are used in a wide variety of applications. Particularly in recent years, lithium ion secondary batteries have been attracting interest as energy sources for electric vehicles (EVs) and hybrid electric vehicles (HEVs), and there has been demand for even higher lithium ion secondary battery performance. Consequently, studies have been made to improve battery members such as electrodes in recent years with the aim of achieving even higher performance of secondary batteries such as lithium ion secondary batteries.

An electrode for a secondary battery generally includes a current collector and an electrode mixed material layer (positive electrode mixed material layer or negative electrode mixed material layer) formed on the current collector. The formation of an electrode mixed material layer is conventionally carried out by dispersing a conductive additive in a dispersion medium using a dispersant formed of a polymer so as to produce a paste for a secondary battery (for example, refer to Patent Literature (PTL) 1). Such a paste for a secondary battery is then mixed with an electrode active material so as to produce a slurry for a secondary battery electrode, and then the dispersion medium is removed from the slurry for a secondary battery electrode to thereby enable formation of an electrode mixed material layer.

CITATION LIST

Patent Literature

PTL 1: WO2016/103730A1

SUMMARY

Technical Problem

However, it would be desirable for a conventional paste for a secondary battery such as described above to further improve adhesiveness of an electrode mixed material layer while also even further reducing internal resistance of a secondary battery.

Accordingly, one object of the present disclosure is to provide a paste for a secondary battery, and method of producing the same, that can cause an electrode mixed material layer to display excellent adhesiveness and can reduce internal resistance of a secondary battery.

Another object of the present disclosure is to provide a slurry for a secondary battery positive electrode that can cause a positive electrode mixed material layer to display excellent adhesiveness and with which it is possible to produce a positive electrode that can reduce internal resistance of a secondary battery.

Another object of the present disclosure is to provide a positive electrode for a secondary battery that can reduce internal resistance of a secondary battery.

Another object of the present disclosure is to provide a secondary battery that has reduced internal resistance.

Solution to Problem

The inventors conducted diligent investigation with the aim of solving the problem set forth above. The inventors reached a new finding that through a paste for a secondary battery that is obtained using carbon nanotubes (hereinafter, also abbreviated as "CNTs") having specific properties as a conductive additive, it is possible to cause an electrode mixed material layer to display excellent adhesiveness while also reducing internal resistance of a secondary battery, and, in this manner, the inventors completed the present disclosure.

Specifically, the present disclosure aims to advantageously solve the problem set forth above, and a presently disclosed paste for a secondary battery comprises a conductive additive, a polymer, and a dispersion medium, wherein the conductive additive includes one or more carbon nanotubes having a surface acid content of not less than 0.01 mmol/g and not more than 0.15 mmol/g, a surface base content of not less than 0.005 mmol/g and not more than 0.500 mmol/g, a ratio of the surface acid content relative to the surface base content of not less than 1.3 and not more than 3.0, and a specific surface area of 150 $m^2/g$ or more. An electrode mixed material layer that is obtained using the CNT-containing paste set forth above has excellent adhesiveness, and, through an electrode that includes this electrode mixed material layer, it is possible to reduce internal resistance of a secondary battery.

Note that the "surface acid content" and "surface base content" of carbon nanotubes referred to in the present disclosure can be measured by methods described in the EXAMPLES section.

Also note that the "specific surface area" referred to in the present disclosure is the BET specific surface area according to nitrogen adsorption and can be measured, for example, using a Belsorp-mini (produced by MicrotracBEL Corp.; conforming with ASTM D3037-81).

In the presently disclosed paste for a secondary battery, the polymer preferably includes a nitrile group-containing monomer unit in a proportion of not less than 10 mass % and not more than 40 mass % and includes a conjugated diene monomer unit in a proportion of not less than 15 mass % and not more than 55 mass %. When the polymer has the chemical composition set forth above, internal resistance of a secondary battery can be even further reduced while also improving cycle characteristics of the secondary battery.

Note that when a polymer is said to "include a monomer unit" in the present disclosure, this means that "a polymer obtained using that monomer includes a structural unit derived from the monomer". Also note that the proportional content of each monomer unit in a polymer referred to in the present disclosure can be measured by a nuclear magnetic resonance method such as $^1$H-NMR.

In the presently disclosed paste for a secondary battery, the polymer preferably includes a hydrophilic group. When the polymer includes a hydrophilic group, adhesiveness of an electrode mixed material layer formed from a slurry for an electrode that contains the paste can be further improved, and internal resistance of a secondary battery can be even further reduced.

In the presently disclosed paste for a secondary battery, the polymer preferably has an iodine value of not less than 3 mg/100 mg and not more than 50 mg/100 mg. When the iodine value of the polymer is within the range set forth above, flexibility can be ensured in an electrode that includes an electrode mixed material layer formed from a slurry for an electrode that contains the paste while also even further reducing internal resistance of a secondary battery.

Note that the "iodine value" referred to in the present disclosure can be measured in accordance with JIS K6235 (2006) by a method described in the EXAMPLES section.

In the presently disclosed paste for a secondary battery, proportional content of the conductive additive is preferably not less than 2 mass % and not more than 20 mass %, and proportional content of the polymer is preferably not less than 0.1 mass % and not more than 6 mass %. A paste in which the proportional contents of the conductive additive and the polymer are within the ranges set forth above has excellent handleability. It is also possible to increase productivity in formation of an electrode mixed material layer from a slurry for an electrode that is produced using this paste.

Moreover, the present disclosure aims to advantageously solve the problem set forth above, and a presently disclosed slurry for a secondary battery positive electrode comprises: a positive electrode active material; and any one of the pastes for a secondary battery set forth above. A positive electrode mixed material layer that is formed from a slurry for a positive electrode containing a positive electrode active material and any one of the pastes set forth above has excellent adhesiveness, and through a positive electrode that includes this positive electrode mixed material layer, it is possible to reduce internal resistance of a secondary battery.

In the presently disclosed slurry for a secondary battery positive electrode, nickel preferably constitutes a proportion of not less than 60.0 mol % and not more than 100.0 mol % among transition metal in the positive electrode active material. By using a positive electrode active material in which the proportion constituted by nickel among transition metal is within the range set forth above, it is possible to achieve a higher secondary battery capacity. Moreover, stability of the slurry for a positive electrode can be ensured while also sufficiently achieving reduction of internal resistance of a secondary battery and sufficiently ensuring cycle characteristics of the secondary battery.

Note that the "proportion constituted by nickel among transition metal in a positive electrode active material" that is referred to in the present disclosure can be measured by ICP atomic emission spectroscopy (ICP-AES).

Furthermore, the present disclosure aims to advantageously solve the problem set forth above, and a presently disclosed positive electrode for a secondary battery comprises a positive electrode mixed material layer formed using any one of the slurries for a secondary battery positive electrode set forth above. Through a positive electrode that includes a positive electrode mixed material layer formed from any one of the slurries for a positive electrode set forth above, it is possible to reduce internal resistance of a secondary battery.

Also, the present disclosure aims to advantageously solve the problem set forth above, and a presently disclosed secondary battery comprises the positive electrode for a secondary battery set forth above. A secondary battery that includes the positive electrode set forth above has reduced internal resistance.

Moreover, the present disclosure aims to advantageously solve the problem set forth above, and a presently disclosed method of producing a paste for a secondary battery is a method of producing any one of the pastes for a secondary battery set forth above, comprising: a step of subjecting one or more feedstock carbon nanotubes to acid treatment; a step of subjecting the feedstock carbon nanotubes that have been subjected to the acid treatment to base treatment; a step of washing the feedstock carbon nanotubes that have been subjected to the base treatment so as to obtain the carbon nanotubes; and a step of mixing the conductive additive that includes the carbon nanotubes with the polymer and the dispersion medium. The presently disclosed method of producing a paste for a secondary battery that includes the steps set forth above enables efficient production of the presently disclosed paste for a secondary battery that contains CNTs having specific properties.

ADVANTAGEOUS EFFECT

According to the present disclosure, it is possible to provide a paste for a secondary battery, and method of producing the same, that can cause an electrode mixed material layer to display excellent adhesiveness and can reduce internal resistance of a secondary battery.

Moreover, according to the present disclosure, it is possible to provide a slurry for a secondary battery positive electrode that can cause a positive electrode mixed material layer to display excellent adhesiveness and with which it is possible to produce a positive electrode that can reduce internal resistance of a secondary battery.

Furthermore, according to the present disclosure, it is possible to provide a positive electrode for a secondary battery that can reduce internal resistance of a secondary battery.

Also, according to the present disclosure, it is possible to provide a secondary battery that has reduced internal resistance.

DETAILED DESCRIPTION

The following provides a detailed description of embodiments of the present disclosure.

The presently disclosed paste for a secondary battery can b e used as a material in production of a slurry for a secondary battery electrode (preferably a slurry for a secondary battery positive electrode). Note that the presently disclosed paste for a secondary battery can be produced by the presently disclosed method of producing a paste for a secondary battery. The presently disclosed slurry for a secondary battery positive electrode is produced using the presently disclosed paste for a secondary battery. Moreover, the presently disclosed positive electrode for a secondary battery includes a positive electrode mixed material layer that is formed from the presently disclosed slurry for a secondary battery positive electrode. Furthermore, the presently disclosed secondary battery includes the presently disclosed positive electrode for a secondary battery.

Paste for Secondary Battery

The presently disclosed paste contains a conductive additive, a polymer, and a dispersion medium and optionally contains other components. Note that the presently disclosed paste contains, as the conductive additive, one or more CNTs that have a surface acid content of not less than 0.01 mmol/g and not more than 0.15 mmol/g, a surface base content of not less than 0.005 mmol/g and not more than 0.500 mmol/g, a ratio of the surface acid content relative to the surface base content of not less than 1.3 and not more than 3.0, and a specific surface area of 150 m$^2$/g or more.

By using the presently disclosed paste to produce an electrode mixed material layer, it is possible to improve adhesiveness of the electrode mixed material layer and to reduce internal resistance of a secondary battery as a result of the paste containing CNTs having the properties set forth above.

Conductive Additive

The presently disclosed paste contains one or more CNTs having the specific properties set forth above as a conductive additive. However, it should be noted that the presently disclosed paste may optionally contain conductive additives other than these CNTs (i.e., other conductive additives).

Carbon Nanotubes

The surface acid content of the CNTs is required to be not less than 0.01 mmol/g and not more than 0.15 mmol/g, and is preferably 0.02 mmol/g or more, and more preferably 0.03 mmol/g or more. When the surface acid content is less than 0.01 mmol/g, adhesiveness of an electrode mixed material layer obtained using the paste decreases, and the electrode mixed material layer cannot display strong close adherence to a current collector. Moreover, internal resistance of a secondary battery increases. On the other hand, when the surface acid content is more than 0.15 mmol/g, residual acid components are excessively attached to the surfaces of the CNTs. Internal resistance of a secondary battery is presumed to increase as a consequence of side reactions caused by these residual acid components inside the secondary battery. In addition, setting the surface acid content as not less than 0.01 mmol/g and not more than 0.15 mmol/g enables good dispersion of the CNTs in the dispersion medium and ensures stability of the paste.

The surface base content of the CNTs is required to be not less than 0.005 mmol/g and not more than 0.500 mmol/g, is preferably 0.008 mmol/g or more, and more preferably 0.010 mmol/g or more, and is preferably 0.100 mmol/g or less, and more preferably 0.060 mmol/g or less. When the surface base content is less than 0.005 mmol/g, residual acid components are excessively attached to the surfaces of the CNTs. Internal resistance of a secondary battery is presumed to increase as a consequence of side reactions caused by these residual acid components inside the secondary battery. On the other hand, when the surface base content is more than 0.500 mmol/g, the CNTs aggregate more easily, which is presumed to be due to reaction with acid components contained in a slurry for an electrode that is produced using the paste. Consequently, adhesiveness of an electrode mixed material layer decreases, internal resistance of a secondary battery increases, and cycle characteristics of the secondary battery deteriorate. In addition, setting the surface base content as not less than 0.005 mmol/g and not more than 0.500 mmol/g enables good dispersion of the CNTs in the dispersion medium and ensures stability of the paste.

The ratio of surface acid content relative to surface base content (surface acid content/surface base content) for the CNTs is required to be not less than 1.3 and not more than 3.0, is preferably 1.4 or more, and more preferably 1.5 or more, and is preferably 2.5 or less. When surface acid content/surface base content is less than 1.3, adhesiveness of an electrode mixed material layer obtained using the paste decreases, and the electrode mixed material layer cannot display strong close adherence to a current collector. Moreover, internal resistance of a secondary battery increases. On the other hand, when surface acid content/surface base content is more than 3.0, there is excessive attachment of residual acid components to the surfaces of the CNTs. Internal resistance of a secondary battery is presumed to increase as a consequence of side reactions caused by these residual acid components inside the secondary battery. In addition, setting surface acid content/surface base content as not less than 1.3 and not more than 3.0 enables good dispersion of the CNTs in the dispersion medium and ensures stability of the paste.

The specific surface area of the surface-treated CNTs is required to be 150 m$^2$/g or more, is preferably 170 m$^2$/g or more, more preferably 250 m$^2$/g or more, and even more preferably 300 m$^2$/g or more, and is preferably 1,200 m$^2$/g or less, more preferably 1,000 m$^2$/g or less, and even more preferably 500 m$^2$/g or less. When the specific surface area is less than 150 m$^2$/g, internal resistance of a secondary battery cannot be sufficiently reduced. On the other hand, when the specific surface area is 1,200 m$^2$/g or less, the polymer can bind well to the CNTs, and adhesiveness of an electrode mixed material layer can be sufficiently ensured. Moreover, an electrical conduction network can be sufficiently formed by the CNTs inside an electrode mixed material layer that is obtained using the paste. Consequently, internal resistance of a secondary battery can be even further reduced.

Note that the CNTs may be single-walled CNTs or multi-walled CNTs. Also note that CNTs having the specific properties set forth above can be produced by performing surface treatment of feedstock CNTs (i.e., can be produced as surface-treated carbon nanotubes) by a method subsequently described in the "Production method of paste for secondary battery" section, for example.

The average diameter of the CNTs is preferably not less than 0.5 nm and not more than 200 nm, for example. Moreover, the average length of the CNTs is preferably not less than 1 um and not more than 1,000 um. Note that the average diameter and the average length of the CNTs can be determined as arithmetic mean values for measured values that are obtained by observing the CNTs using a transmission electron microscope (TEM) and then measuring the diameter (outer diameter) and length of each of 50 CNTs from an obtained TEM image.

Other Conductive Additives

Known conductive additives that can be compounded in electrodes of secondary batteries can be used as other conductive additives. Examples of such conductive additives include conductive carbon materials such as carbon black (for example, acetylene black, Ketjenblack® (Ketjenblack is a registered trademark in Japan, other countries, or both), and furnace black), carbon nanohorns, vapor-grown carbon fiber, milled carbon fiber obtained by pyrolyzing and then pulverizing polymer fiber, single layer or multilayer graphene, and carbon nonwoven fabric sheet obtained through pyrolysis of nonwoven fabric made from polymer fiber; and fibers and foils of various metals. One of these other conductive additives may be used individually, or two or more of these other conductive additives may be used in combination.

By using such other conductive additives in conjunction with the CNTs described above, it may be possible to increase electrical conductivity in an electrode mixed material layer obtained using the paste by forming even better electrical conduction paths and to further reduce internal resistance of a secondary battery.

The proportion constituted by other conductive additives included among the conductive additive may, for example, be not less than 0 mass % and not more than 50 mass % when the mass of the entire conductive additive (i.e., the total mass of the CNTs described above and other conductive additives) is taken to be 100 mass %.

Proportional Content of Conductive Additive

The proportional content of the conductive additive in the paste when the mass of the entire paste is taken to be 100 mass % is preferably 2 mass % or more, more preferably 3 mass % or more, and even more preferably 4 mass % or more, and is preferably 20 mass % or less, more preferably 10 mass % or less, and even more preferably 8 mass % or less. When the proportional content of the conductive additive is 2 mass % or more, the solid content concentration of a slurry for an electrode produced using the paste can be increased, and productivity in formation of an electrode mixed material layer from the slurry for an electrode can be increased. On the other hand, when the proportional content of the conductive additive is 20 mass % or less, the viscosity of the paste does not excessively increase, and handleability can be sufficiently ensured.

The proportional content of the above-described CNTs in the paste when the mass of the entire paste is taken to be 100 mass % is preferably 2 mass % or more, more preferably 3 mass % or more, and even more preferably 4 mass % or more, and is preferably 20 mass % or less, more preferably 10 mass % or less, and even more preferably 8 mass % or less. When the proportional content of the CNTs is 2 mass % or more, the solid content concentration of a slurry for an electrode produced using the paste can be increased, and productivity in formation of an electrode mixed material layer from the slurry for an electrode can be increased. On the other hand, when the proportional content of the CNTs is 20 mass % or less, the viscosity of the paste does not excessively increase, and handleability can be sufficiently ensured.

Polymer

The polymer is not specifically limited so long as it is a polymer (dispersant) that has a function of enabling dispersion of the above-described conductive additive in the dispersion medium in the presently disclosed paste for a secondary battery.

Note that the polymer can also function as a component that, in an electrode mixed material layer formed on a current collector using a slurry for an electrode containing the presently disclosed paste, can hold components contained in the electrode mixed material layer so that they do not detach from the electrode mixed material layer (i.e., can function as a binder).

The polymer may be acrylic rubber (ACM), polyvinylpyrrolidone (PVP), polyvinylidene fluoride (PVDF), nitrile rubber (NBR), or hydrogenated nitrile rubber (HNBR), for example. One of these polymers may be used individually, or two or more of these polymers may be used in combination. Of these polymers, polyvinylpyrrolidone, polyvinylidene fluoride, nitrile rubber, and hydrogenated nitrile rubber are preferable from a viewpoint of improving stability of the paste and even further reducing internal resistance of a secondary battery while also improving cycle characteristics of the secondary battery, with nitrile rubber and hydrogenated nitrile rubber being more preferable, and hydrogenated nitrile rubber even more preferable.

The polymer preferably includes a hydrophilic group from a viewpoint of further improving adhesiveness of an electrode mixed material layer formed from a slurry for an electrode that contains the paste and even further reducing internal resistance of a secondary battery. The hydrophilic group may be a carboxy group, a sulfo group, a phosphate group, or a hydroxy group, for example. The polymer may include just one of these types of hydrophilic groups or may include two or more of these types of hydrophilic groups. Of these hydrophilic groups, a carboxy group is preferable from a viewpoint of achieving further improvement of adhesiveness of an electrode mixed material layer and even further reduction of internal resistance of a secondary battery.

Example of Polymer

Although the following describes one example of a suitable polymer, the present disclosure is not limited to this example.

The polymer may, for example, preferably include one or more selected from the group consisting of a nitrile group-containing monomer unit, a conjugated diene monomer unit, and a hydrophilic group-containing monomer unit, and more preferably include each of a nitrile group-containing monomer unit, a conjugated diene monomer unit, and a hydrophilic group-containing monomer unit. Note that the polymer may include structural units other than the nitrile group-containing monomer unit, the conjugated diene monomer unit, and the hydrophilic group-containing monomer unit(i.e., other structural units).

Nitrile Group-Containing Monomer Unit

Examples of nitrile group-containing monomers that can form the nitrile group-containing monomer unit include $\alpha,\beta$-ethylenically unsaturated nitrile monomers. Specifically, any $\alpha,\beta$-ethylenically unsaturated compound that includes a nitrile group can be used without any specific limitations as an $\alpha,\beta$-ethylenically unsaturated nitrile monomer, and examples thereof include acrylonitrile, methacrylonitrile, and a-alkylacrylonitriles ($\alpha$-ethylacrylonitrile, etc.). One of these nitrile group-containing monomers may be used individually, or two or more of these nitrile group-containing monomers may be used in combination. Of these nitrile group-containing monomers, acrylonitrile is preferable.

The proportion constituted by the nitrile group-containing monomer unit among all structural units included in the polymer when all structural units are taken to be 100 mass % is preferably 10 mass % or more, more preferably 13 mass % or more, and even more preferably 18 mass % or more, and is preferably 40 mass % or less, more preferably 33 mass % or less, and even more preferably 28 mass % or less. When the proportion constituted by the nitrile group-containing monomer unit among all structural units is 10 mass % or more, the polymer dissolves well in a dispersion medium such as N-methylpyrrolidone, and dispersing capability of the polymer increases. Consequently, the conductive additive can be dispersed well, and stability of the paste can be improved. It is also possible to form an electrode mixed material layer having the conductive additive dispersed well therein and to even further reduce internal resistance of a secondary battery. On the other hand, when the proportion constituted by the nitrile group-containing monomer unit among all structural units is 40 mass % or less, excessive swelling of the polymer caused by electrolyte solution can be suppressed, and cycle characteristics of a secondary battery can be improved.

Conjugated Diene Monomer Unit

Examples of conjugated diene monomers that can form the conjugated diene monomer unit include 1,3-butadiene, isoprene, 2,3-dimethyl-1,3-butadiene, and 1,3-pentadiene. One of these conjugated diene monomers may be used individually, or two or more of these conjugated diene monomers may be used in combination.

Note that the term "conjugated diene monomer unit" as used in the present disclosure is also inclusive of a structural unit (hydrogenated unit) obtained through hydrogenation of a monomer unit included in a polymer that has been obtained using a conjugated diene monomer.

Of the conjugated diene monomers described above, 1,3-butadiene and isoprene are preferable. In other words, the conjugated diene monomer unit is preferably a 1,3-butadiene unit, an isoprene unit, a hydrogenated 1,3-butadiene unit, or a hydrogenated isoprene unit.

The proportion constituted by the conjugated diene monomer unit among all structural units included in the polymer when all structural units are taken to be 100 mass % is preferably 15 mass % or more, more preferably 20 mass % or more, even more preferably 25 mass % or more, and particularly preferably 30 mass % or more, and is preferably 55 mass % or less, more preferably 50 mass % or less, and even more preferably 45 mass % or less. When the proportion constituted by the conjugated diene monomer unit among all structural units is 15 mass % or more, flexibility is ensured in an electrode that includes an electrode mixed material layer formed from a slurry for an electrode containing the paste. On the other hand, when the proportion constituted by the conjugated diene monomer unit among all structural units is 50 mass % or less, the polymer dissolves well in a dispersion medium such as N-methylpyrrolidone, and dispersing capability of the polymer increases. Consequently, the conductive additive can be dispersed well, and stability of the paste can be improved. Moreover, when the proportion constituted by the conjugated diene monomer unit among all structural units is not less than 15 mass % and not more than 55 mass %, internal resistance of a secondary battery can be even further reduced while also improving cycle characteristics of the secondary battery.

Hydrophilic Group-Containing Monomer Unit

Examples of hydrophilic group-containing monomers that can form the hydrophilic group-containing monomer unit include polymerizable monomers having a hydrophilic group. Specific examples of hydrophilic group-containing monomers include carboxy group-containing monomers, sulfo group-containing monomers, phosphate group-containing monomers, and hydroxy group-containing monomers.

Examples of carboxy group-containing monomers include monocarboxylic acids, derivatives of monocarboxylic acids, dicarboxylic acids, acid anhydrides of dicarboxylic acids, and derivatives of dicarboxylic acids and acid anhydrides thereof.

Examples of monocarboxylic acids include acrylic acid, methacrylic acid, and crotonic acid.

Examples of derivatives of monocarboxylic acids include 2-ethylacrylic acid, isocrotonic acid, α-acetoxyacrylic acid, β-transaryloxyacrylic acid, α-chloro-β-E-methoxyacrylic acid, and β-diaminoacrylic acid.

Examples of dicarboxylic acids include maleic acid, fumaric acid, and itaconic acid.

Examples of derivatives of dicarboxylic acids include methylmaleic acid, dimethylmaleic acid, phenylmaleic acid, chloromaleic acid, dichloromaleic acid, fluoromaleic acid, and maleic acid esters such as methyl allyl maleate, diphenyl maleate, nonyl maleate, decyl maleate, dodecyl maleate, octadecyl maleate, and fluoroalkyl maleates.

Examples of acid anhydrides of dicarboxylic acids include maleic anhydride, acrylic anhydride, methylmaleic anhydride, and dimethylmaleic anhydride.

Furthermore, an acid anhydride that produces a carboxy group upon hydrolysis can also be used as a carboxy group-containing monomer.

Other examples include monoesters and diesters of α,β-ethylenically unsaturated polybasic carboxylic acids such as monoethyl maleate, diethyl maleate, monobutyl maleate, dibutyl maleate, monoethyl fumarate, diethyl fumarate, monobutyl fumarate, dibutyl fumarate, monocyclohexyl fumarate, dicyclohexyl fumarate, monoethyl itaconate, diethyl itaconate, monobutyl itaconate, and dibutyl itaconate.

Examples of sulfo group-containing monomers include vinyl sulfonic acid, methyl vinyl sulfonic acid, (meth)allyl sulfonic acid, styrene sulfonic acid, (meth)acrylic acid 2-sulfoethyl, 2-acrylamido-2-methylpropane sulfonic acid, and 3-allyloxy-2-hydroxypropane sulfonic acid.

In the present disclosure, "(meth)acryl" is used to indicate "acryl" and/or "methacryl". Also, in the present disclosure, "(meth)allyl" is used to indicate "allyl" and/or "methallyl".

Examples of phosphate group-containing monomers include 2-(meth)acryloyloxyethyl phosphate, methyl-2-(meth)acryloyloxyethyl phosphate, and ethyl-(meth)acryloyloxyethyl phosphate.

In the present disclosure, "(meth)acryloyl" is used to indicate "acryloyl" and/or "methacryloyl".

Examples of hydroxy group-containing monomers include ethylenically unsaturated alcohols such as (meth)allyl alcohol, 3-buten-1-ol, and 5-hexen-1-ol; alkanol esters of ethylenically unsaturated carboxylic acids such as 2-hydroxyethyl acrylate, 2-hydroxypropyl acrylate, 2-hydroxyethyl methacrylate, 2-hydroxypropyl methacrylate, di-2-hydroxyethyl maleate, di-4-hydroxybutyl maleate, and di-2-hydroxypropyl itaconate; esters of (meth)acrylic acid and polyalkylene glycol represented by a general formula $CH_2=CR^1-COO-(C_qH_{2q}O)_p-H$ (where p represents an integer of 2 to 9, q represents an integer of 2 to 4, and $R^1$ represents a hydrogen atom or a methyl group); mono(meth)acrylic acid esters of dihydroxy esters of dicarboxylic acids such as 2-hydroxyethyl-2'-(meth)acryloyloxy phthalate and 2-hydroxyethyl-2'-(meth)acryloyloxy succinate; vinyl ethers such as 2-hydroxyethyl vinyl ether and 2-hydroxypropyl vinyl ether; mono(meth)allyl ethers of alkylene glycols such as (meth)allyl-2-hydroxyethyl ether, (meth)allyl-2-hydroxypropyl ether, (meth)allyl-3-hydroxypropyl ether, (meth)allyl-2-hydroxybutyl ether, (meth)allyl-3-hydroxybutyl ether, (meth)allyl-4-hydroxybutyl ether, and (meth)allyl-6-hydroxyhexyl ether; polyoxyalkylene glycol mono(meth)allyl ethers such as diethylene glycol mono(meth)allyl ether and dipropylene glycol mono(meth)allyl ether; mono(meth)allyl ethers of halogen or hydroxy substituted (poly)alkylene glycols such as glycerin mono(meth)allyl ether, (meth)allyl-2-chloro-3-hydroxypropyl ether, and (meth)allyl-2-hydroxy-3-chloropropyl ether; mono(meth)allyl ethers of polyhydric phenols such as eugenol and isoeugenol, and halogen substituted products thereof; and (meth)allyl thioethers of alkylene glycols such as (meth)allyl-2-hydroxyethyl thioether and (meth)allyl-2-hydroxypropyl thioether.

One of these hydrophilic group-containing monomers may be used individually, or two or more of these hydrophilic group-containing monomers may be used in combination. Of these hydrophilic group-containing monomers, carboxy group-containing monomers are preferable from a viewpoint of further improving adhesiveness of an electrode mixed material layer while also even further reducing internal resistance of a secondary battery, and acrylic acid and methacrylic acid are more preferable.

The proportion constituted by the hydrophilic group-containing monomer unit among all structural units included in the polymer when all structural units are taken to be 100 mass % is preferably 0.05 mass % or more, more preferably 0.1 mass % or more, even more preferably 1 mass % or more, and particularly preferably 3 mass % or more, and is preferably 10 mass % or less, and more preferably 8 mass % or less. When the proportion constituted by the hydrophilic group-containing monomer unit among all structural units is 0.05 mass % or more, adhesiveness of an electrode mixed material layer obtained using the paste further improves, and the electrode mixed material layer can display even stronger close adherence to a current collector. Moreover, internal resistance of a secondary battery can be even further reduced. On the other hand, when the proportion constituted by the hydrophilic group-containing monomer unit among all structural units is 10 mass % or less, the polymer dissolves well in a dispersion medium such as N-methylpyrrolidone, and dispersing capability of the polymer increases. Consequently, the conductive additive can be dispersed well, and stability of the paste can be improved.

Other Structural Units

Examples of other structural units include structural units derived from known monomers that are copolymerizable with the nitrile group-containing monomers, conjugated diene monomers, and hydrophilic group-containing monomers described above without any specific limitations. More specifically, an aromatic vinyl monomer unit is preferable as another structural unit, for example, but other structural units are not specifically limited thereto.

Examples of aromatic vinyl monomers that can form the aromatic vinyl monomer unit include styrene, styrenesulfonic acid and salts thereof, α-methylstyrene, butoxystyrene, and vinylnaphthalene. One of these aromatic vinyl monomers may be used individually, or two or more of these aromatic vinyl monomers may be used in combination. Of these aromatic vinyl monomers, styrene is preferable.

The proportion constituted by the aromatic vinyl monomer unit among all structural units included in the polymer when all structural units are taken to be 100 mass % is preferably 15 mass % or more, more preferably 20 mass % or more, and even more preferably 24 mass % or more, and is preferably 55 mass % or less, more preferably 50 mass % or less, and even more preferably 45 mass % or less. When the proportion constituted by the aromatic vinyl monomer unit among all structural units is 15 mass % or more, it is possible to form an electrode mixed material layer having the conductive additive dispersed well therein and to even further reduce internal resistance of a secondary battery. On the other hand, when the proportion constituted by the aromatic vinyl monomer unit among all structural units is 55 mass % or less, flexibility is ensured in an electrode that includes an electrode mixed material layer formed from a slurry for an electrode containing the paste.

Examples of (meth)acrylic acid ester monomers that can form a (meth)acrylic acid ester monomer unit include (meth)acrylic acid alkyl esters and (meth)acrylic acid perfluoroalkyl esters.

Examples of (meth)acrylic acid alkyl esters include acrylic acid alkyl esters such as methyl acrylate, ethyl acrylate, n-propyl acrylate, isopropyl acrylate, n-butyl acrylate, t-butyl acrylate, isobutyl acrylate, n-pentyl acrylate, isopentyl acrylate, hexyl acrylate, heptyl acrylate, octyl acrylate, 2-ethylhexyl acrylate, nonyl acrylate, decyl acrylate, lauryl acrylate, n-tetradecyl acrylate, and stearyl acrylate; and methacrylic acid alkyl esters such as methyl methacrylate, ethyl methacrylate, n-propyl methacrylate, isopropyl methacrylate, n-butyl methacrylate, t-butyl methacrylate, isobutyl methacrylate, n-pentyl methacrylate, isopentyl methacrylate, hexyl methacrylate, heptyl methacrylate, octyl methacrylate, 2-ethylhexyl methacrylate, nonyl methacrylate, decyl methacrylate, lauryl methacrylate, n-tetradecyl methacrylate, stearyl methacrylate, and glycidyl methacrylate.

Examples of (meth)acrylic acid perfluoroalkyl esters include 2-(perfluoroalkyl)ethyl acrylates such as 2-(perfluorobutyl)ethyl acrylate, 2-(perfluoropentyl)ethyl acrylate, 2-(perfluorohexyl)ethyl acrylate, 2-(perfluorooctyl)ethyl acrylate, 2-(perfluorononyl)ethyl acrylate, 2-(perfluorodecyl)ethyl acrylate, 2-(perfluorododecyl)ethyl acrylate, 2-(perfluorotetradecyl)ethyl acrylate, and 2-(perfluorohexadecyl)ethyl acrylate; and 2-(perfluoroalkyl)ethyl methacrylates such as 2-(perfluorobutyl)ethyl methacrylate, 2-(perfluoropentyl)ethyl methacrylate, 2 -(perfluorohexyl)ethyl methacrylate, 2-(perfluorooctyl)ethyl methacrylate, 2-(perfluorononyl)ethyl methacrylate, 2-(perfluorodecyl)ethyl methacrylate, 2-(perfluorododecyl)ethyl methacrylate, 2-(perfluorotetradecyl)ethyl methacrylate, and 2-(perfluorohexadecyl)ethyl methacrylate.

One of these (meth)acrylic acid ester monomers may be used individually, or two or more of these (meth)acrylic acid ester monomers may be used in combination.

In a case in which the polymer includes a (meth)acrylic acid ester monomer unit, the proportion constituted by the (meth)acrylic acid ester monomer unit among all structural units included in the polymer when all structural units are taken to be 100 mass % is preferably 15 mass % or more, more preferably 20 mass % or more, and even more preferably 24 mass % or more, and is preferably 55 mass % or less, more preferably 50 mass % or less, and even more preferably 45 mass % or less.

Properties

The iodine value of the polymer is preferably 3 mg/100 mg or more, and is preferably 50 mg/100 mg or less, more preferably 25 mg/100 mg or less, and even more preferably 8 mg/100 mg or less. When the iodine value is 3 mg/100 mg or more, flexibility is ensured in an electrode that includes an electrode mixed material layer formed from a slurry for an electrode containing the paste. On the other hand, when the iodine value is 50 mg/100 mg or less, it is possible to form an electrode mixed material layer having the conductive additive dispersed well therein and to even further reduce internal resistance of a secondary battery.

Production Method

No specific limitations are placed on the method by which the polymer is produced. For example, the polymer can be produced by polymerizing a monomer composition containing the monomers described above and then optionally performing hydrogenation.

Note that the proportional content of each monomer in the monomer composition can be set in accordance with the proportional content of each monomer unit in the polymer.

The method of polymerization is not specifically limited and may be any of solution polymerization, suspension polymerization, bulk polymerization, emulsion polymerization, and the like. A known emulsifier or polymerization initiator may be used in these polymerization methods as necessary.

The method of hydrogenation is not specifically limited and may be a typical method using a catalyst (for example, refer to WO2012/165120A1, WO2013/080989A1, and JP2013-8485A).

Proportional Content of Polymer

The proportional content of the polymer in the paste when the mass of the entire paste is taken to be 100 mass % is preferably 0.1 mass % or more, more preferably 0.3 mass % or more, even more preferably 0.4 mass % or more, and particularly preferably 0.7 mass % or more, and is preferably 6 mass % or less, more preferably 3 mass % or less, and even more preferably 2.4 mass % or less. When the proportional content of the polymer is 0.1 mass % or more, the conductive additive can be dispersed well, and stability of the paste can be improved. On the other hand, when the proportional content of the polymer is 6 mass % or less, internal resistance of a secondary battery can be sufficiently reduced.

Dispersion Medium

Although no specific limitations are placed on the dispersion medium, it is preferable to use a polar organic solvent in which the polymer described above can dissolve. Examples of such organic solvents that may be used include acetonitrile, N-methylpyrrolidone, cyclopentanone, N,N-dimethylacetamide, dimethylformamide, dimethyl sulfoxide, methylformamide, methyl ethyl ketone, and furfural. Of these organic solvents, N-methylpyrrolidone is preferable from a viewpoint of ease of handling, safety, and so forth. Note that the dispersion medium may be one type used individually or may be a combination of two or more types.

Other Components

Components such as viscosity modifiers, reinforcing materials, antioxidants, surfactants, and additives for electrolyte solution having a function of inhibiting electrolyte solution decomposition, for example, may be mixed into the paste as other components. Commonly known examples of these other components can be used. One of these other components may be used individually, or two or more of these other components may be used in combination.

Note that the presently disclosed paste does not normally contain an electrode active material (positive electrode active material or negative electrode active material).

Production Method of Paste for Secondary Battery

The presently disclosed paste for a secondary battery set forth above can be obtained using the presently disclosed method of producing a paste for a secondary battery, for example.

The presently disclosed method of producing a paste for a secondary battery includes at least: a step of subjecting one or more feedstock CNTs to acid treatment (acid treatment step); a step of subjecting the feedstock CNTs that have been subjected to the acid treatment to base treatment (base treatment step); a step of washing the feedstock CNTs that have been subjected to the base treatment so as to obtain CNTs (surface-treated CNTs) having specific properties (washing step); and a step of mixing a conductive additive including the surface-treated CNTs with a polymer and the previously described dispersion medium (mixing step).

By using the presently disclosed method of producing a paste for a secondary battery, it is possible to efficiently produce the presently disclosed paste for a secondary battery that contains one or more CNTs having specific properties.

Acid Treatment Step

In the acid treatment step, one or more feedstock CNTs are subjected to acid treatment. The feedstock CNTs are not specifically limited and may be selected from known CNTs as appropriate depending on the properties of the surface-treated CNTs that are desired (number of walls, specific surface area, etc.).

Although no specific limitations are placed on the method of acid treatment so long as an acid can be brought into contact with the feedstock CNTs, a method in which the feedstock CNTs are immersed in an acid treatment solution (aqueous solution of an acid) is preferable.

The acid contained in the acid treatment solution may be nitric acid, sulfuric acid, or hydrochloric acid, for example, without any specific limitations. One of these acids may be used individually, or two or more of these acids may be used in combination. Of these acids, nitric acid and sulfuric acid are preferable.

The time for which the feedstock CNTs are immersed in the acid treatment solution (immersion time) is preferably 1 minute or more, more preferably 10 minutes or more, even more preferably 30 minutes or more, and particularly preferably 50 minutes or more, and is preferably 120 minutes or less, more preferably 100 minutes or less, and even more preferably 80 minutes or less. The surface acid content of the surface-treated CNTs can be increased when the immersion time is 1 minute or more, whereas the surface acid content of the surface-treated CNTs does not excessively increase and paste production efficiency is sufficiently ensured when the immersion time is 120 minutes or less.

The temperature when the feedstock CNTs are immersed in the acid treatment solution (immersion temperature) is preferably 20° C. or higher, and more preferably 40° C. or higher, and is preferably 80° C. or lower, and more preferably 70° C. or lower. When the immersion temperature is within any of the ranges set forth above, the surface acid content of the obtained surface-treated CNTs can be increased to a suitable degree.

After this immersion, CNTs that have undergone the acid treatment step (acid-treated CNTs) can be collected from a mixture of the acid-treated CNTs and the acid treatment solution by a known technique such as filtration. The acid-treated CNTs that are collected may then be washed with water as necessary.

Base Treatment Step

In the base treatment step, the acid-treated CNTs that have been obtained through the acid treatment step described above are subjected to base treatment.

Although no specific limitations are placed on the method of base treatment so long as a base can be brought into contact with the acid-treated CNTs, a method in which the acid-treated CNTs are immersed in a base treatment solution (aqueous solution of a base) is preferable.

The base contained in the base treatment solution may be lithium hydroxide, ammonium chloride, sodium bicarbonate, or sodium hydroxide, for example, without any specific limitations. One of these bases may be used individually, or two or more of these bases may be used in combination. Of these bases, sodium bicarbonate is preferable.

The time for which the acid-treated CNTs are immersed in the base treatment solution (immersion time) is preferably 5 minutes or more, more preferably 20 minutes or more, and even more preferably 40 minutes or more, and is preferably 120 minutes or less, more preferably 100 minutes or less, and even more preferably 80 minutes or less. The surface base content of the surface-treated CNTs can be increased when the immersion time is 5 minutes or more, whereas the surface base content of the surface-treated CNTs does not excessively increase and paste production efficiency is sufficiently ensured when the immersion time is 120 minutes or less.

The temperature when the acid-treated CNTs are immersed in the base treatment solution (immersion temperature) is preferably 10° C. or higher, more preferably 20° C. or higher, and preferably 28° C. or higher, and is preferably 40° C. or lower, and more preferably 35° C. or lower. When the immersion temperature is within any of the ranges set forth above, the surface base content of the obtained surface-treated CNTs can be increased to a suitable degree.

Washing Step

In the washing step, feedstock CNTs that have been obtained through the acid treatment step and base treatment step described above (i.e., acid/base-treated CNTs) are washed. This washing can remove excess acid components and base components (particularly base components) attached to the surfaces of the acid/base-treated CNTs and makes it possible to obtain surface-treated CNTs having specific properties.

Although no specific limitations are placed on the method by which the acid/base-treated CNTs are washed, water washing is preferable. For example, the acid/base-treated CNTs may be collected from a mixture of the acid/base-treated CNTs and the base treatment solution by a known technique such as filtration and these acid/base-treated CNTs may be washed with water. In this washing, it is possible to estimate to what extent acid components and base components have been removed by measuring the electrical conductivity of water (washing water) obtained after washing of the acid/base-treated CNTs.

After the washing step described above, removal of surface-attached water by drying and the like may be performed as necessary to obtain the surface-treated CNTs.

Note that the surface acid content and the surface base content of the surface-treated CNTs can be adjusted by altering conditions of the acid treatment step, base treatment step, and washing step described above. For example, the surface acid content and the surface base content of the surface-treated CNTs can be adjusted by altering the types and concentrations of the acid and the base that are respectively contained in the acid treatment solution and the base treatment solution used in the acid treatment step and the base treatment step. Moreover, the surface acid content of the surface-treated CNTs can be increased by increasing the immersion time in the acid treatment step, whereas the surface base content of the surface-treated CNTs can be increased by increasing the immersion time in the base treatment step. Furthermore, the surface acid content and the surface base content (particularly the surface base content) can be adjusted by altering the extent to which washing is performed in the washing step.

Mixing Step

In the mixing step, surface-treated CNTs that have been obtained as described above are mixed with a polymer and a dispersion medium, and also with other conductive additives and/or other components that are used as necessary. The method of mixing in the mixing step is not specifically limited and can be performed using a typical mixing device such as a disper blade, a mill, or a kneader, for example.

Slurry for Secondary Battery Positive Electrode

The presently disclosed slurry for a secondary battery positive electrode contains a positive electrode active material and the presently disclosed paste for a secondary battery set forth above. In other words, the presently disclosed slurry for a positive electrode contains a positive electrode active material, one or more CNTs having specific properties, a polymer, and a dispersion medium and optionally further contains other conductive additives and/or other components.

As a result of the presently disclosed slurry for a positive electrode being produced using the presently disclosed paste, it is possible to, by forming a positive electrode mixed material layer from the slurry for a positive electrode, cause the positive electrode mixed material layer to display excellent adhesiveness and reduce internal resistance of a secondary battery.

Positive Electrode Active Material

The positive electrode active material is a material that gives and receives electrons in a positive electrode of a secondary battery. In a case in which the secondary battery is a lithium ion secondary battery, for example, the positive electrode active material is normally a material that can occlude and release lithium.

Although the following describes, as one example, a case in which the slurry for a secondary battery positive electrode is a slurry for a lithium ion secondary battery positive electrode, the presently disclosed slurry for a secondary battery positive electrode is not limited to the following example.

The positive electrode active material for a lithium ion secondary battery may be a known positive electrode active material such as lithium-containing cobalt oxide ($LiCoO_2$), lithium manganate ($LiMn_2O_4$), lithium-containing nickel oxide ($LiNiO_2$), a lithium-containing complex oxide of Co—Ni—Mn (for example, Li[Co$_\alpha$Mn$_\beta$Ni$_\gamma$]O$_2$, $\alpha+\beta+\gamma=1$), a lithium-containing complex oxide of Ni—Mn—Al, a lithium-containing complex oxide of Ni—Co—Al, olivine-type lithium iron phosphate (LiFePO$_4$), olivine-type lithium manganese phosphate (LiMnPO$_4$), a Li$_2$MnO$_3$—LiNiO$_2$-based solid solution, a lithium-rich spinel compound represented by Li$_{1+x}$Mn$_{2-x}$O$_4$ (0<x<2), Li[Ni$_{0.17}$Li$_{0.2}$Co$_{0.07}$Mn$_{0.56}$]O$_2$, or LiNi$_{0.5}$Mn$_{1.5}$O$_4$ without any specific limitations.

From a viewpoint of increasing secondary battery capacity, the positive electrode active material is preferably a positive electrode active material in which the proportion constituted by nickel among transition metal is not less than 60.0 mol % and not more than 100.0 mol %. In the case of a slurry for a positive electrode that is produced using a positive electrode active material in which the proportion of nickel among transition metal is high, there are instances in which stability of the slurry for a positive electrode is poor, and thus there are instances in which internal resistance increases and cycle characteristics deteriorate in a secondary battery. However, by producing a slurry for a positive electrode using such a positive electrode active material in which the proportion of nickel among transition metal is high and the presently disclosed paste, it is possible to ensure stability of the slurry for a positive electrode while also sufficiently achieving improvement of internal resistance and cycle characteristics of a secondary battery.

Examples of transition metals other than nickel that may be contained in the positive electrode active material include cobalt, manganese, iron, and titanium. Moreover, examples of positive electrode active materials in which the proportion constituted by nickel among transition metal is not less than 60.0 mol % and not more than 100.0 mol % include LiNi$_{0.6}$Co$_{0.2}$Mn$_{0.2}$O$_2$ and LiNi$_{0.8}$Co$_{0.1}$Mn$_{0.1}$O$_2$.

The particle diameter of the positive electrode active material is not specifically limited and may be the same as that of a conventionally used positive electrode active material. Moreover, one positive electrode active material may be used individually, or two or more positive electrode active materials may be used in combination.

The proportional content of the positive electrode active material in the slurry for a positive electrode is not specifically limited but is preferably not less than 90 mass % and not more than 99 mass % when all solid content in the slurry for a positive electrode is taken to be 100 mass %.

Paste for Secondary Battery

The presently disclosed paste for a secondary battery set forth above that contains a conductive additive, a polymer, and a dispersion medium and optionally contains other components is used as the paste for a secondary battery.

The proportional content of the conductive additive in the slurry for a positive electrode is not specifically limited but is preferably not less than 0.4 mass % and not more than 5 mass % when all solid content in the slurry for a positive electrode is taken to be 100 mass %.

The proportional content of the polymer in the slurry for a positive electrode is also not specifically limited but is preferably not less than 0.01 mass % and not more than 2 mass % when all solid content in the slurry for a positive electrode is taken to be 100 mass %.

Production Method of Slurry for Positive Electrode

The presently disclosed slurry for a positive electrode can be produced by mixing the above-described positive electrode active material and the above-described paste for a secondary battery. The method of mixing is not specifically limited and can be performed using a typical mixing device such as a disper blade, a mill, or a kneader, for example.

Positive Electrode for Secondary Battery

The presently disclosed positive electrode for a secondary battery includes a positive electrode mixed material layer formed using the presently disclosed slurry for a secondary battery positive electrode set forth above.

The presently disclosed positive electrode can be formed by, for example, applying the presently disclosed slurry for a positive electrode set forth above onto the surface of a current collector to form a coating film, and subsequently drying the coating film that has been formed. In other words, the positive electrode mixed material layer of the presently disclosed positive electrode is formed of a dried product of the presently disclosed slurry for a positive electrode set forth above, normally contains a positive electrode active material, one or more CNTs having specific properties, and a polymer, and optionally further contains other conductive additives and/or other components. Note that components contained in the positive electrode mixed material layer are components that were contained in the slurry for a positive electrode, and the content ratio of these components is normally the same as the content ratio thereof in the slurry for a positive electrode.

The presently disclosed positive electrode can reduce internal resistance of a secondary battery as a result of the presently disclosed positive electrode including a positive electrode mixed material layer that is formed from the presently disclosed slurry for a positive electrode.

Production Method of Positive Electrode

The presently disclosed positive electrode can be formed on a current collector through a step of applying the slurry for a positive electrode set forth above onto the current collector (application step) and a step of drying the slurry for a positive electrode that has been applied onto the current collector so as to form a positive electrode mixed material layer on the current collector (drying step), for example.

Application Step

The method by which the slurry for a positive electrode is applied onto the current collector is not specifically limited and may be a commonly known method. Specific examples of application methods that can be used include doctor blading, dip coating, reverse roll coating, direct roll coating, gravure coating, extrusion coating, and brush coating. During application, the slurry may be applied onto one side or both sides of the current collector. The thickness of the slurry coating on the current collector after application but before drying may be set as appropriate in accordance with the thickness of the positive electrode mixed material layer to be obtained after drying.

The current collector onto which the slurry for a positive electrode is applied is a material having electrical conductivity and electrochemical durability. Specifically, the current collector may, for example, be made of iron, copper, aluminum, nickel, stainless steel, titanium, tantalum, gold, platinum, or the like. One of these materials may be used individually, or two or more of these materials may be used in combination in a freely selected ratio.

Drying Step

The method by which the slurry for a positive electrode on the current collector is dried is not specifically limited and may be a commonly known method. Examples of drying methods that can be used include drying by warm, hot, or low-humidity air; drying in a vacuum; and drying by irradiation with infrared light, electron beams, or the like. Through drying of the slurry on the current collector in this manner, a positive electrode mixed material layer can be formed on the current collector to thereby obtain a positive electrode including the current collector and the positive electrode mixed material layer.

After the drying step, the positive electrode mixed material layer may be further subjected to a pressing process such as mold pressing or roll pressing. The pressing process can improve close adherence between the positive electrode mixed material layer and the current collector. Furthermore, in a situation in which the positive electrode mixed material layer contains a curable polymer, the polymer is preferably cured after the positive electrode mixed material layer has been formed.

Secondary Battery

The presently disclosed secondary battery includes the presently disclosed positive electrode for a secondary battery set forth above. More specifically, the presently disclosed secondary battery normally includes a positive electrode, a negative electrode, an electrolyte solution, and a separator, wherein the positive electrode is the presently disclosed positive electrode set forth above.

The presently disclosed secondary battery has reduced internal resistance as a result of the presently disclosed positive electrode set forth above being used therein.

Negative Electrode

Any known negative electrode that is used in production of a secondary battery can be used in the presently disclosed secondary battery as a negative electrode for a secondary battery without any specific limitations. For example, such a negative electrode may be a negative electrode that is obtained by forming a negative electrode mixed material layer on a current collector by a known production method.

Electrolyte Solution

The electrolyte solution is normally an organic electrolyte solution obtained by dissolving a supporting electrolyte in an organic solvent. For example, a lithium salt is used as a supporting electrolyte in a lithium ion secondary battery. Examples of lithium salts that may be used include $LiPF_6$, $LiAsF_6$, $LiBF_4$, $LiSbF_6$, $LiA_1Cl_4$, $LiClO_4$, $CF_3SO_3Li$, $C_4F_9SO_3Li$, $CF_3COOLi$, $(CF_3CO)_2NLi$, $(CF_3SO_2)_2NLi$, and $(C_2F_5SO_2)NLi$. Of these lithium salts, $LiPF_6$, $LiClO_4$, and $CF_3SO_3Li$ are preferable because they readily dissolve in solvents and exhibit a high degree of dissociation, with $LiPF_6$ being particularly preferable. One electrolyte may be used individually, or two or more electrolytes may be used in combination in a freely selected ratio. In general, lithium ion conductivity tends to increase when a supporting electrolyte having a high degree of dissociation is used. Therefore, lithium ion conductivity can be adjusted through the type of supporting electrolyte that is used.

The organic solvent used in the electrolyte solution is not specifically limited so long as the supporting electrolyte can dissolve therein. Examples of organic solvents that can suitably be used include carbonates such as dimethyl carbonate (DMC), ethylene carbonate (EC), diethyl carbonate (DEC), propylene carbonate (PC), butylene carbonate (BC), and ethyl methyl carbonate (EMC); esters such as γ-butyrolactone and methyl formate; ethers such as 1,2-dimethoxyethane and tetrahydrofuran; and sulfur-containing compounds such as sulfolane and dimethyl sulfoxide. Furthermore, a mixture of such solvents may be used. Of these solvents, carbonates are preferable due to having high permittivity and a wide stable potential region.

The concentration of the electrolyte in the electrolyte solution may be adjusted as appropriate. Furthermore, known additives may be added to the electrolyte solution.

Separator

The separator may be a separator such as described in JP2012-204303A, for example, but is not specifically limited thereto. Of these separators, a microporous membrane made of polyolefinic (polyethylene, polypropylene, polybutene, or polyvinyl chloride) resin is preferred because such a membrane can reduce the total thickness of the separator, which increases the ratio of electrode active material in the secondary battery, and consequently increases the volumetric capacity.

The secondary battery can be produced by, for example, stacking the positive electrode and the negative electrode with the separator in-between, performing rolling, folding, or the like of the resultant laminate in accordance with the battery shape, as necessary, to place the laminate in a battery container, injecting the electrolyte solution into the battery container, and sealing the battery container.

Note that the positive electrode for a secondary battery set forth above is used in the presently disclosed secondary battery. Also note that in the presently disclosed secondary battery, an overcurrent preventing device such as a PTC device or a fuse; an expanded metal; or a lead plate may be provided as necessary in order to prevent pressure increase inside the secondary battery and occurrence of overcharging or overdischarging. The shape of the secondary battery may be a coin type, button type, sheet type, cylinder type, prismatic type, flat type, or the like.

EXAMPLES

The following provides a more specific description of the present disclosure based on examples. However, the present disclosure is not limited to the following examples. In the following description, "%" and "parts" used in expressing quantities are by mass, unless otherwise specified.

In the examples and comparative examples, the following methods were used to evaluate the surface acid content, surface base content, and specific surface area of carbon nanotubes, the stability of a paste for a secondary battery, the adhesiveness of a positive electrode mixed material layer, and the internal resistance of a secondary battery.

Surface Acid Content

Approximately 1 g of measurement subject CNTs were precisely weighed, were then immersed in 100 mL of 0.01 mol $dm^{-3}$ Tetrabutylammonium Hydroxide (TBA OH)/4-methyl-2-pentanone (MIBK) solution, and were stirred by a stirrer for 1 hour. Thereafter, centrifugal separation was performed, and the supernatant was filtered using a filter. Residual TBA OH in 50 mL of the resultant filtrate was quantitatively analyzed by performing non-aqueous coulometric titration with 0.01 mol dm$^{-3}$ perchloric acid (HClO$_4$)/MIBK solution, and then the acid content (mmol/g) per 1 g of CNTs was determined from the obtained value. Note that this analysis was performed using an automatic coulometric titrator (produced by Kyoto Electronics Manufacturing Co., Ltd.; product name: AT-700). Also note that this sequence of operations was performed under argon gas flow at room temperature.

Surface Base Content

Approximately 1 g of measurement subject CNTs were precisely weighed, were then immersed in 100 mL of 0.01 mol dm$^{-3}$ HClO$_4$/MIBK solution, and were stirred by a stirrer for 1 hour.

Thereafter, centrifugal separation was performed, and the supernatant was filtered using a filter. Residual HClO$_4$ in 50 mL of the resultant filtrate was quantitatively analyzed by performing non-aqueous coulometric titration with 0.01 mol dm$^{-3}$ TBA OH/MIBK solution, and then the base content (mmol/g) per 1 g of CNTs was determined from the obtained value. Note that this analysis was performed using an automatic coulometric titrator (produced by Kyoto Electronics Manufacturing Co., Ltd.; product name: AT-700). Also note that this sequence of operations was performed under argon gas flow at room temperature.

Specific Surface Area

The specific surface area (BET specific surface area) of CNTs was measured using a Belsorp-mini (produced by MicrotracBEL Corp.; conforming with ASTM D3037-81).

Stability

The viscosity (initial viscosity) of a paste for a secondary battery straight after production was measured using a rheometer (MCR 302 produced by Anton Paar GmbH) under conditions of a temperature of 25° C. and a shear rate of 0.1 s$^{-1}$. Next, the paste for a secondary battery was stored at normal temperature for 7 days, and then the viscosity (post-storage viscosity) of the paste for a secondary battery was measured under the same conditions as the initial viscosity. A value (%) for the post-storage viscosity when the initial viscosity was taken to be 100% was evaluated by the following standard. A smaller viscosity change indicates that the paste has better stability.
A: Post-storage viscosity of not less than 100% and less than 150%
B: Post-storage viscosity of not less than 150% and less than 200%
C: Post-storage viscosity of not less than 200% and less than 250%
D: Post-storage viscosity of 250% or more Adhesiveness A positive electrode for a lithium ion secondary battery was cut out as a rectangle of 100 mm in length and 10 mm in width to obtain a test specimen. The test specimen was placed with the surface at which a positive electrode mixed material layer was present facing downward, and cellophane tape (tape conforming with JIS Z1522) was affixed to the surface of the positive electrode mixed material layer. One end of the current collector was then pulled in a perpendicular direction, and the stress when the current collector was peeled off at a speed of 100 mm/min was measured (note that the cellophane tape was fixed to a test stage). A total of three measurements were made in this manner. An average value of the measurements was calculated, was taken to be the peel strength, and was evaluated by the following standard. A larger value for the peel strength indicates that there is stronger close adherence between the positive electrode mixed material layer and the current collector and that the positive electrode mixed material layer has better adhesiveness.
A: Peel strength of 30 N/m or more
B: Peel strength of not less than 25 N/m and less than 30 N/m
C: Peel strength of not less than 20 N/m and less than 25 N/m
D: Peel strength of less than 20 N/m Internal Resistance A secondary battery was charged to a 50% SOC (State Of Charge) at 1C (C is a value expressed by rated capacity (mA)/1 hour (h)) in a 25° C. atmosphere. Thereafter, the secondary battery was subjected to 20 seconds of charging and 20 seconds of discharging centered around an SOC of 50% at each of 0.2 C, 0.5 C, 1.0 C, 2.0 C, and 3.0 C. A plot was prepared of the battery voltage after 20 seconds relative to the current value in each of these cases (charging side and discharging side), and the gradient of this plot was determined as the IV resistance (Ω) (IV resistance during charging and IV resistance during discharging). With respect to the obtained IV resistance value (Ω), a rate of change (%) was calculated by taking a value for Comparative Example 5 as a reference (0% for Comparative Example 5) and was evaluated by the following standard. A smaller IV resistance (relative to Comparative Example 5) indicates less internal resistance and better secondary battery output characteristics.
A: IV resistance reduced by 11.0% or more
B: IV resistance reduced by not less than 6.0% and less than 11.0%
C: IV resistance reduced by not less than 1.0% and less than 6.0%
D: IV resistance reduced by less than 1.0%, same as Comparative Example 5, or increased from Comparative Example 5

Example 1

Production of Surface-Treated CNTs

Multi-walled carbon nanotubes (specific surface area: 300 m$^2$/g) that had been weighed out in an amount of 0.8 g were added to a mixed solution of 20 mL of concentrated nitric acid and 20 mL of 1 M sulfuric acid and were stirred for 1 hour while being kept at 60° C. (acid treatment). Thereafter, solid-liquid separation was performed by filtration using filter paper (Toyo Roshi Kaisha, Filter Paper No. 2, 125 mm). Solids on the filter paper were washed using 200 mL of purified water, and then CNT solids (acid-treated CNTs) were collected. These CNT solids were added into 200 mL of sodium bicarbonate aqueous solution having a concentration of 2 mol/L and were subsequently stirred for 1 hour while being kept at 30° C. in a water bath (base treatment). Thereafter, solid-liquid separation was performed by vacuum filtration using a membrane filter having a pore diameter of 10 μm. CNT solids (acid/base-treated CNTs) on the membrane filter were repeatedly washed using purified water. Once the electrical conductivity of washing water reached 50 μs/m or less, solid-liquid separation of the CNT solids was performed by the same method as described above. The obtained CNT solids were dried under reduced pressure at 50° C. for 8 hours to thereby produce surface-treated CNTs. The surface acid content, surface base content, and specific surface area of these surface-treated CNTs were measured. In addition, a ratio of the surface acid content relative to the surface base content was calculated. Each of the results is shown in Table 1.

Production of Polymer

A reactor having an internal capacity of 10 L was charged with 100 parts of deionized water and 23 parts of acrylonitrile, 30 parts of 1,3-butadiene, 4 parts of methacrylic acid, and 43 parts of styrene as monomers, and then 2 parts of potassium oleate as an emulsifier, 0.1 parts of potassium phosphate as a stabilizer, and 0.5 parts of 2,2',4,6,6'-pentamethylheptane-4-thiol (TIBM) as a molecular weight modifier were added, and emulsion polymerization was performed at 30° C. in the presence of 0.35 parts of potassium persulfate as a polymerization initiator so as to copolymerize the aforementioned monomers.

At the point at which the polymerization conversion rate reached 90%, 0.2 parts of hydroxylamine sulfate was added per 100 parts of monomer to end polymerization. Next, heating was performed, residual monomer was collected by steam distillation under reduced pressure at approximately 70° C., and then 2 parts of an alkylated phenol was added as an antioxidant to obtain a water dispersion of a polymer.

A 1 L autoclave equipped with a stirrer was charged with 400 mL of the obtained water dispersion of the polymer (total solid content: 48 g), and then nitrogen gas was passed for 10 minutes in order to remove dissolved oxygen in the water dispersion. Thereafter, 50 mg of palladium acetate was dissolved in 180 mL of water to which nitric acid had been added in an amount of 4 molar equivalents relative to the Pd and was then added into the autoclave as a hydrogenation reaction catalyst. Purging of the system with hydrogen gas was performed twice, and then the contents of the autoclave were heated to 50° C. in a state in which the pressure was raised to 3 MPa (gauge pressure) with hydrogen gas, and a hydrogenation reaction was carried out for 6 hours.

Thereafter, the contents were restored to normal temperature, the system was converted to a nitrogen atmosphere, and then an evaporator was used to perform concentrating to a solid content concentration of 40%, and thereby yield hydrogenated nitrile rubber as a polymer.

N-Methylpyrrolidone was added to an aqueous solution in which the solid content concentration of the hydrogenated nitrile rubber as a polymer was 40%, and then distillation was performed under reduced pressure to remove water and excess N-methylpyrrolidone, and thereby yield an N-methylpyrrolidone solution of the hydrogenated nitrile rubber having a solid content concentration of 8%.

Production of Paste for Secondary Battery

After adding together 4 parts of the surface-treated CNTs obtained as described above, 0.8 parts (in terms of solid content) of the N-methylpyrrolidone solution of the hydrogenated nitrile rubber obtained as described above, and an appropriate amount of N-methylpyrrolidone as a dispersion medium and stirring these materials using a disper blade (3,000 rpm, 60 minutes), 1 hour of mixing thereof was performed at a circumferential speed of 8 m/s in a bead mill in which zirconia beads of 1 mm in diameter were used so as to produce a paste for a secondary battery. Note that this paste had a viscosity of 49,000 mPas at a temperature of 25° C. and a shear rate of 0.1 $s^{-1}$ as measured using a rheometer (MCR 302 produced by Anton Paar GmbH) and had a solid content concentration value of 4.8%. The stability of this paste for a secondary battery was also evaluated. The result is shown in Table 1.

Production of Slurry for Secondary Battery Positive Electrode

A slurry for a secondary battery positive electrode was produced by adding 100 parts of a ternary active material having a layered structure ($LiNi_{0.6}Co_{0.2}Mn_{0.2}O_2$; proportion of nickel among transition metal: 60.0 mol %; volume-average particle diameter: 10 μm) as a positive electrode active material and an appropriate amount of N-methylpyrrolidone as a dispersion medium to the paste for a secondary battery obtained as described above and performing stirring thereof using a disper blade (3,000 rpm, 20 minutes). Note that the additive amount of N-methylpyrrolidone was adjusted such that the viscosity of the obtained slurry for a positive electrode at 60 rpm was within a range of 3,000 mPa·s to 4,000 mPa·s.

Production of Positive Electrode for Secondary Battery

Aluminum foil of 20 μm in thickness was prepared as a current collector. The slurry for a positive electrode obtained as described above was applied onto one side of the aluminum foil by a comma coater such as to have a coating weight after drying of 20 mg/$cm^2$, was dried at 90° C. for 20 minutes and at 120° C. for 20 minutes, and was then heat treated at 60° C. for 10 hours to obtain a positive electrode web. This positive electrode web was rolled by roll pressing to produce a sheet-shaped positive electrode including the aluminum foil and a positive electrode mixed material layer (density: 3.2 g/$cm^3$). The sheet-shaped positive electrode was cut to 48.0 mm in width and 47 cm in length to obtain a positive electrode for a lithium ion secondary battery. This positive electrode for a lithium ion secondary battery was used to evaluate the adhesiveness of the positive electrode mixed material layer. The result is shown in Table 1.

Production of Negative Electrode for Secondary Battery

A slurry for a secondary battery negative electrode was produced by stirring a mixture of 90 parts of spherical artificial graphite (volume-average particle diameter: 12 μm) and 10 parts of $SiO_x$ (volume-average particle diameter: 10 μm) as a negative electrode active material, 1 part of a styrene butadiene polymer as a binder for a negative electrode, 1 part of carboxymethyl cellulose as a thickener, and an appropriate amount of water as a dispersion medium using a planetary mixer.

Next, copper foil of 15 μm in thickness was prepared as a current collector. The slurry for a secondary battery negative electrode obtained as described above was applied onto one side of the copper foil such as to have a coating weight after drying of 10 mg/$cm^2$ and was dried at 60° C. for 20 minutes and at 120° C. for 20 minutes.

Thereafter, 2 hours of heat treatment was performed at 150° C. to obtain a negative electrode web. This negative electrode web was rolled by roll pressing to produce a sheet-shaped negative electrode including the copper foil and a negative electrode mixed material layer of 1.6 g/cm$^3$ in density. The sheet-shaped negative electrode was cut to 50.0 mm in width and 52 cm in length to obtain a negative electrode for a lithium ion secondary battery.

Production of Secondary Battery

The positive electrode for a lithium ion secondary battery and negative electrode for a lithium ion secondary battery that were produced as described above were wound using a core of 20 mm in diameter with the electrode mixed material layers of the electrodes facing each other and with a separator (microporous membrane made of polypropylene) of 15 μm in thickness interposed between the electrodes so as to obtain a roll. The obtained roll was compressed to a thickness of 4.5 mm from one direction at a rate of 10 mm/s. Note that the compressed roll had an elliptical shape in plan view, and the ratio of the major axis to the minor axis (major axis/minor axis) was 7.7.

In addition, an electrolyte solution (LiPF$_6$ solution of 1.0 M in concentration (solvent: mixed solution having 5 mass % of fluoroethylene carbonate added to mixed solvent of ethylene carbonate/ethyl methyl carbonate=3/7 (mass ratio); additive: 2 volume % of vinylene carbonate)) was prepared.

The compressed roll was subsequently housed in a laminate case made of aluminum together with 3.2 g of the electrolyte solution. After connecting a nickel lead to a specific location on the negative electrode for a lithium ion secondary battery and connecting an aluminum lead to a specific location on the positive electrode for a lithium ion secondary battery, an opening of the case was heat sealed to obtain a lithium ion secondary battery. The lithium ion secondary battery had a pouch shape of 35 mm in width, 60 mm in height, and 5 mm in thickness and had a nominal capacity of 700 mAh.

The internal resistance of the obtained lithium ion secondary battery was evaluated. The result is shown in Table 1.

Example 2

Surface-treated CNTs, a polymer, a paste for a secondary battery, a slurry for a secondary battery positive electrode, a positive electrode for a secondary battery, a negative electrode for a secondary battery, and a secondary battery were produced and various evaluations were performed in the same way as in Example 1 with the exception that the acid/base-treated CNTs were washed until the electrical conductivity of washing water was 15 μs/m or less in production of the surface-treated CNTs. The results are shown in Table 1.

Example 3

Surface-treated CNTs, a polymer, a paste for a secondary battery, a slurry for a secondary battery positive electrode, a positive electrode for a secondary battery, a negative electrode for a secondary battery, and a secondary battery were produced and various evaluations were performed in the same way as in Example 1 with the exception that the base treatment time was changed from 1 hour to 3 hours in production of the surface-treated CNTs. The results are shown in Table 1.

Example 4

Surface-treated CNTs, a polymer, a paste for a secondary battery, a slurry for a secondary battery positive electrode, a positive electrode for a secondary battery, a negative electrode for a secondary battery, and a secondary battery were produced and various evaluations were performed in the same way as in Example 1 with the exception that the feedstock CNTs were changed to other multi-walled CNTs (specific surface area: 170 m$^2$/g) in production of the surface-treated CNTs and that the amount of the surface-treated CNTs was changed from 4 parts to 7 parts and the amount of the polymer was changed from 0.8 parts to 0.7 parts in production of the paste for a secondary battery. The results are shown in Table 1.

Example 5

Surface-treated CNTs, a polymer, a paste for a secondary battery, a slurry for a secondary battery positive electrode, a positive electrode for a secondary battery, a negative electrode for a secondary battery, and a secondary battery were produced and various evaluations were performed in the same way as in Example 1 with the exception that 18 parts of acrylonitrile, 41 parts of 1,3-butadiene, 4 parts of methacrylic acid, and 37 parts of styrene were used as monomers in production of the polymer. The results are shown in Table 1.

Example 6

Surface-treated CNTs, a polymer, a paste for a secondary battery, a slurry for a secondary battery positive electrode, a positive electrode for a secondary battery, a negative electrode for a secondary battery, and a secondary battery were produced and various evaluations were performed in the same way as in Example 1 with the exception that 28 parts of acrylonitrile, 44 parts of 1,3-butadiene, 4 parts of methacrylic acid, and 24 parts of styrene were used as monomers in production of the polymer. The results are shown in Table 1.

Example 7

Surface-treated CNTs, a polymer, a paste for a secondary battery, a slurry for a secondary battery positive electrode, a positive electrode for a secondary battery, a negative electrode for a secondary battery, and a secondary battery were produced and various evaluations were performed in the same way as in Example 1 with the exception that 40 parts of acrylonitrile and 60 parts of 1,3 -butadiene were used as monomers in production of the polymer. The results are shown in Table 1.

Example 8

Surface-treated CNTs, a paste for a secondary battery, a slurry for a secondary battery positive electrode, a positive electrode for a secondary battery, a negative electrode for a secondary battery, and a secondary battery were produced and various evaluations were performed in the same way as in Example 1 with the exception that a polymer was not produced and that a polymer indicated below was used as a dispersant. The results are shown in Table 1.
Example 8: PVP (Polyvinylpyrrolidone K-14 produced by Junsei Chemical Co., Ltd.)

Comparative Example 1

Surface-treated CNTs, a polymer, a paste for a secondary battery, a slurry for a secondary battery positive electrode, a positive electrode for a secondary battery, a negative electrode for a secondary battery, and a secondary battery were produced and various evaluations were performed in the same way as in Example 1 with the exception that the acid/base-treated CNTs were washed until the electrical conductivity of washing water was approximately 150 μs/m in production of the surface-treated CNTs. The results are shown in Table 2.

Comparative Example 2

Surface-treated CNTs, a polymer, a paste for a secondary battery, a slurry for a secondary battery positive electrode, a positive electrode for a secondary battery, a negative electrode for a secondary battery, and a secondary battery were produced and various evaluations were performed in the same way as in Example 1 with the exception that the acid/base-treated CNTs were washed until the electrical conductivity of washing water was approximately 350 μs/m in production of the surface-treated CNTs. The results are shown in Table 2.

Comparative Example 3

Surface-treated CNTs, a polymer, a paste for a secondary battery, a slurry for a secondary battery positive electrode, a positive electrode for a secondary battery, a negative electrode for a secondary battery, and a secondary battery were produced and various evaluations were performed in the same way as in Example 1 with the exception that the base treatment time was changed from 1 hour to 30 minutes and the acid/base-treated CNTs were washed until the electrical conductivity of washing water was approximately 150 μs/m in production of the surface-treated CNTs. The results are shown in Table 2.

Comparative Example 4

Surface-treated CNTs, a polymer, a paste for a secondary battery, a slurry for a secondary battery positive electrode, a positive electrode for a secondary battery, a negative electrode for a secondary battery, and a secondary battery were produced and various evaluations were performed in the same way as in Example 1 with the exception that the feedstock CNTs were changed to other multi-walled CNTs (specific surface area: 100 $m^2$/g) in production of the surface-treated CNTs and that the amount of the surface-treated CNTs was changed from 4 parts to 15 parts and the amount of the polymer was changed from 0.8 parts to 1.5 parts in production of the paste for a secondary battery. The results are shown in Table 2.

Comparative Example 5

A polymer, a paste for a secondary battery, a slurry for a secondary battery positive electrode, a positive electrode for a secondary battery, a negative electrode for a secondary battery, and a secondary battery were produced and various evaluations were performed in the same way as in Example 1 with the exception that surface-treated CNTs were not produced and that the feedstock CNTs were used instead of surface-treated CNTs. The results are shown in Table 2.

Comparative Example 6

Surface-treated CNTs, a polymer, a paste for a secondary battery, a slurry for a secondary battery positive electrode, a positive electrode for a secondary battery, a negative electrode for a secondary battery, and a secondary battery were produced and various evaluations were performed in the same way as in Example 1 with the exception that base treatment was not performed and that the acid-treated CNTs were washed until the electrical conductivity of washing water was approximately 350 μs/m in production of the surface-treated CNTs. The results are shown in Table 2.

In Tables 1 and 2, shown below:
"AN" indicates acrylonitrile unit;
"BD" indicates 1,3-butadiene unit (or hydrogenated 1,3-butadiene unit);
"MAA" indicates methacrylic acid unit; and
"ST" indicates styrene unit.

TABLE 1

| | | | | Example 1 | Example 2 | Example 3 | Example 4 | Example 5 | Example 6 | Example 7 | Example 8 |
|---|---|---|---|---|---|---|---|---|---|---|---|
| Paste | Conductive additive (CNTs) | Surface acid content [mmol/g] | | 0.125 | 0.015 | 0.125 | 0.110 | 0.125 | 0.125 | 0.125 | 0.125 |
| | | Surface base content [mmol/g] | | 0.053 | 0.006 | 0.090 | 0.045 | 0.053 | 0.053 | 0.053 | 0.053 |
| | | Surface acid content/Surface base content [—] | | 2.36 | 2.50 | 1.39 | 2.44 | 2.36 | 2.36 | 2.36 | 2.36 |
| | | Specific surface area [$m^2$/g] | | 300 | 300 | 300 | 170 | 300 | 300 | 300 | 300 |
| | | Proportion in paste [mass %] | | 4 | 4 | 4 | 7 | 4 | 4 | 4 | 4 |
| | Polymer | Chemical composition | Nitrile group-containing monomer unit | Type | AN | AN | AN | AN | AN | AN | AN | PVP |
| | | | | Proportion [mass %] | 23 | 23 | 23 | 23 | 18 | 28 | 40 | |
| | | | Conjugated diene monomer unit | Type | BD | BD | BD | BD | BD | BD | BD | |
| | | | | Proportion [mass %] | 30 | 30 | 30 | 30 | 41 | 44 | 60 | |
| | | | Hydrophilic group-containing monomer unit | Type | MAA | MAA | MAA | MAA | MAA | MAA | — | |
| | | | | Proportion [mass %] | 4 | 4 | 4 | 4 | 4 | 4 | — | |
| | | | Other structural unit | Type | ST | ST | ST | ST | ST | ST | — | |
| | | | | Proportion [mass %] | 43 | 43 | 43 | 43 | 37 | 24 | — | |
| | | Iodine value [mg/100 mg] | | 5.6 | 5.6 | 5.6 | 5.6 | 5.6 | 5.6 | 15 | |
| | | Proportion in paste [mass %] | | 0.8 | 0.8 | 0.8 | 0.7 | 0.8 | 0.8 | 0.8 | 0.8 |
| | Stability | | | A | A | B | A | A | A | B | B |
| | Adhesiveness | | | A | B | B | A | A | A | B | B |
| | Internal resistance | | | A | B | A | B | A | A | B | C |

TABLE 2

|  |  |  |  |  | Comparative Example 1 | Comparative Example 2 | Comparative Example 3 | Comparative Example 4 | Comparative Example 5 | Comparative Example 6 |
|---|---|---|---|---|---|---|---|---|---|---|
| Paste | Conductive additive (CNTs) |  | Surface acid content [mmol/g] |  | 0.310 | 0.803 | 0.304 | 0.130 | 0.074 | 0.910 |
|  |  |  | Surface base content [mmol/g] |  | 0.150 | 0.605 | 0.080 | 0.048 | 0.067 | 0.045 |
|  |  |  | Surface acid content/Surface base content [—] |  | 2.07 | 1.33 | 3.80 | 2.71 | 1.10 | 20.22 |
|  |  |  | Specific surface area [m²/g] |  | 300 | 300 | 300 | 100 | 300 | 300 |
|  |  |  | Proportion in paste [mass %] |  | 4 | 4 | 4 | 15 | 4 | 4 |
|  | Polymer | Chemical composition | Nitrile group-containing monomer unit | Type | AN | AN | AN | AN | AN | AN |
|  |  |  |  | Proportion [mass %] | 23 | 23 | 23 | 23 | 23 | 23 |
|  |  |  | Conjugated diene monomer unit | Type | BD | BD | BD | BD | BD | BD |
|  |  |  |  | Proportion [mass %] | 30 | 30 | 30 | 30 | 30 | 30 |
|  |  |  | Hydrophilic group-containing monomer unit | Type | MAA | MAA | MAA | MAA | MAA | MAA |
|  |  |  |  | Proportion [mass %] | 4 | 4 | 4 | 4 | 4 | 4 |
|  |  |  | Other structural unit | Type | ST | ST | ST | ST | ST | ST |
|  |  |  |  | Proportion [mass %] | 43 | 43 | 43 | 43 | 43 | 43 |
|  |  | Iodine value [mg/100 mg] |  |  | 5.6 | 5.6 | 5.6 | 5.6 | 5.6 | 5.6 |
|  |  | Proportion in paste [mass %] |  |  | 0.8 | 0.8 | 0.8 | 1.5 | 0.8 | 0.8 |
|  |  | Stability |  |  | C | D | B | A | B | D |
|  |  | Adhesiveness |  |  | C | C | C | A | D | C |
|  |  | Internal resistance |  |  | D | D | D | D | D | D |

It can be seen from Table 1 that adhesiveness of a positive electrode mixed material layer could be improved while also reducing internal resistance of a secondary battery in Examples 1 to 8 in which a positive electrode was produced using a paste for a secondary battery that contained CNTs having specific properties. It can also be seen that stability of the paste for a secondary battery was excellent in Examples 1 to 8.

In contrast, it can be seen from Table 2 that internal resistance of a secondary battery increased and that stability of a paste for a secondary battery and adhesiveness of a positive electrode mixed material layer decreased in Comparative Example 1 in which the used paste for a secondary battery contained CNTs having a surface acid content that was outside of a specific range.

It can also be seen from Table 2 that internal resistance of a secondary battery increased and that stability of a paste for a secondary battery and adhesiveness of a positive electrode mixed material layer decreased in Comparative Example 2 in which the used paste for a secondary battery contained CNTs having a surface acid content and a surface base content that were outside of specific ranges.

It can also be seen from Table 2 that internal resistance of a secondary battery increased and that adhesiveness of a positive electrode mixed material layer decreased in Comparative Example 3 in which the used paste for a secondary battery contained CNTs having a surface acid content and a ratio of surface acid content relative to surface base content that were outside of specific ranges.

It can also be seen from Table 2 that internal resistance of a secondary battery increased in Comparative Example 4 in which the used paste for a secondary battery contained CNTs having a specific surface area that was less than a specific value.

It can also be seen from Table 2 that internal resistance of a secondary battery increased and that adhesiveness of a positive electrode mixed material layer decreased in Comparative Example 5 in which the used paste for a secondary battery contained CNTs having a ratio of surface acid content relative to surface base content that was outside of a specific range.

It can also be seen from Table 2 that internal resistance of a secondary battery increased and that stability of a paste for a secondary battery and adhesiveness of a positive electrode mixed material layer decreased in Comparative Example 6 in which the used paste for a secondary battery contained CNTs having a surface acid content and a ratio of surface acid content relative to surface base content that were outside of specific ranges.

INDUSTRIAL APPLICABILITY

According to the present disclosure, it is possible to provide a paste for a secondary battery, and method of producing the same, that can cause an electrode mixed material layer to display excellent adhesiveness and can reduce internal resistance of a secondary battery.

Moreover, according to the present disclosure, it is possible to provide a slurry for a secondary battery positive electrode that can cause a positive electrode mixed material layer to display excellent adhesiveness and with which it is possible to produce a positive electrode that can reduce internal resistance of a secondary battery.

Furthermore, according to the present disclosure, it is possible to provide a positive electrode for a secondary battery that can reduce internal resistance of a secondary battery.

Also, according to the present disclosure, it is possible to provide a secondary battery having reduced internal resistance.

The invention claimed is:

1. A paste for a secondary battery comprising a conductive additive, a polymer, and a dispersion medium, wherein
the conductive additive includes one or more carbon nanotubes having a surface acid content of not less than 0.01 mmol/g and not more than 0.15 mmol/g, a surface base content of not less than 0.005 mmol/g and not more than 0.500 mmol/g, a ratio of the surface acid content relative to the surface base content of not less than 1.3 and not more than 3.0, and a specific surface area of 150 m$^2$/g or more, and wherein the surfaces of the one or more carbon nanotubes are substantially free of amino functional groups.

2. The paste for a secondary battery according to claim 1, wherein the polymer includes a nitrile group-containing monomer unit in a proportion of not less than 10 mass % and not more than 40 mass % and includes a conjugated diene monomer unit in a proportion of not less than 15 mass % and not more than 55 mass %.

3. The paste for a secondary battery according to claim 1, wherein the polymer includes a hydrophilic group.

4. The paste for a secondary battery according to claim 1, wherein the polymer has an iodine value of not less than 3 mg/100 mg and not more than 50 mg/100 mg.

5. The paste for a secondary battery according to claim 1, wherein proportional content of the conductive additive is not less than 2 mass % and not more than 20 mass %, and proportional content of the polymer is not less than 0.1 mass % and not more than 6 mass %.

6. A slurry for a secondary battery positive electrode comprising: a positive electrode active material; and the paste for a secondary battery according to claim 1.

7. The slurry for a secondary battery positive electrode according to claim 6, wherein nickel constitutes a proportion of not less than 60.0 mol % and not more than 100.0 mol % among transition metal in the positive electrode active material.

8. A positive electrode for a secondary battery comprising a positive electrode mixed material layer formed using the slurry for a secondary battery positive electrode according to claim 6.

9. A secondary battery comprising the positive electrode for a secondary battery according to claim 8.

10. A method of producing the paste for a secondary battery according to claim 1, comprising:
- a step of subjecting one or more feedstock carbon nanotubes to acid treatment;
- a step of contacting the acid-treated carbon nanotubes with a base treatment wherein a base is selected from the group consisting of lithium hydroxide, sodium bicarbonate, and sodium hydroxide;
- a step of washing the feedstock carbon nanotubes that have been subjected to the base treatment so as to obtain the carbon nanotubes; and
- a step of mixing the conductive additive that includes the carbon nanotubes with the polymer and the dispersion medium.

* * * * *